United States Patent
Yochum et al.

(10) Patent No.: US 8,414,144 B2
(45) Date of Patent: Apr. 9, 2013

(54) QUICK CHANGE LAMP BALLAST ASSEMBLY

(75) Inventors: Donald Yochum, Marietta, GA (US);
John C. Elmes, III, Orlando, FL (US);
Michael Pepper, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 314 days.

(21) Appl. No.: 12/870,517

(22) Filed: Aug. 27, 2010

(65) Prior Publication Data

US 2010/0319953 A1 Dec. 23, 2010

Related U.S. Application Data

(63) Continuation of application No. PCT/US2008/002624, filed on Feb. 28, 2008.

(51) Int. Cl.
*F21V 23/00* (2006.01)
(52) U.S. Cl.
USPC .............................. 362/221; 362/260; 362/265
(58) Field of Classification Search .................. 362/221, 362/222, 260, 265
See application file for complete search history.

(56) References Cited

U.S. PATENT DOCUMENTS

| | | | |
|---|---|---|---|
| 2,487,460 A * | 11/1949 | Mauric | 74/810.2 |
| 2,487,468 A | 11/1949 | Naysmith | |
| 2,489,245 A | 11/1949 | Sola | |
| 2,595,487 A * | 5/1952 | Runge et al. | 362/221 |
| 3,360,687 A | 12/1967 | Riesland | |
| 3,514,590 A * | 5/1970 | Shaeffer | 362/382 |
| 3,569,694 A | 3/1971 | Comer | |
| 3,655,906 A | 4/1972 | Robb | |
| 4,161,019 A * | 7/1979 | Mulvey | 362/147 |
| 4,277,728 A | 7/1981 | Stevens | |
| 4,674,015 A | 6/1987 | Smith | |
| 4,729,740 A * | 3/1988 | Crowe et al. | 439/76.1 |
| 4,916,363 A * | 4/1990 | Burton et al. | 315/276 |
| 5,350,316 A * | 9/1994 | Van Wagener et al. | 439/460 |
| 5,762,509 A * | 6/1998 | Kang | 439/232 |
| 5,919,061 A * | 7/1999 | Wozniczka et al. | 439/552 |
| 5,942,727 A | 8/1999 | Strange | |
| 6,059,424 A | 5/2000 | Kotloff | |
| 7,830,649 B2 * | 11/2010 | Yang | 361/674 |
| 2004/0076001 A1* | 4/2004 | Lutes | 362/221 |
| 2007/0211457 A1 | 9/2007 | Mayfield | |
| 2007/0253205 A1 | 11/2007 | Welker | |
| 2008/0007944 A1* | 1/2008 | Verfuerth et al. | 362/157 |
| 2009/0295304 A1* | 12/2009 | Yang | 315/276 |

* cited by examiner

*Primary Examiner* — John A Ward
(74) *Attorney, Agent, or Firm* — Brian S. Steinberger; Phyllis K. Wood; Law Offices of Brian S. Steinberger, P.A.

(57) ABSTRACT

Method, apparatus and systems for a quick change lamp ballast assembly for newly manufactured lamp fixtures having the quick change ballast or a retrofit for an existing lamp fixture. The quick change ballast assembly includes a ballast mounting fixture 110 for housing the ballast 300, a wire connector fixture 130 and a mounting plate 120 for mounting the ballast mounting fixture 110. The ballast assembly allows for replacement of a non operating ballast to reduce replacement time and labor costs. In a new lamp fixture, the quick change ballast is thermally isolated from the lamp fixture, which reduces the effects of the waste heat from the ballast, and increase overall building efficiency by reducing the cooling load.

12 Claims, 15 Drawing Sheets

Fig.9
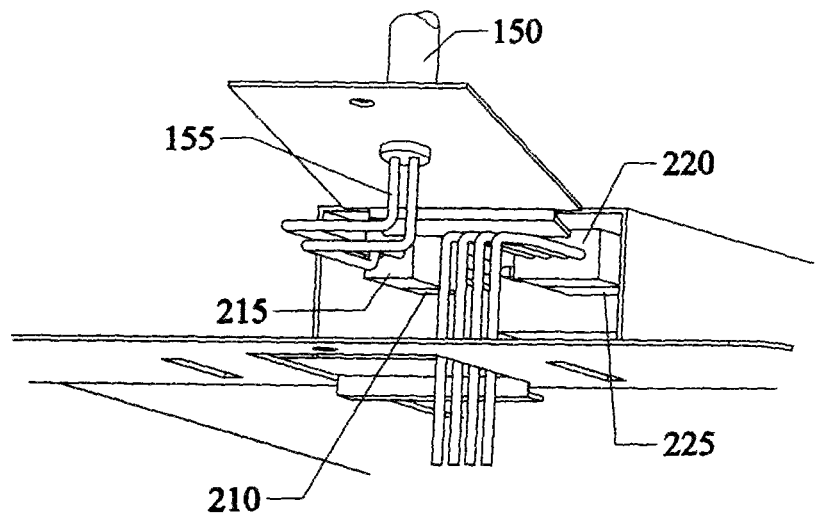
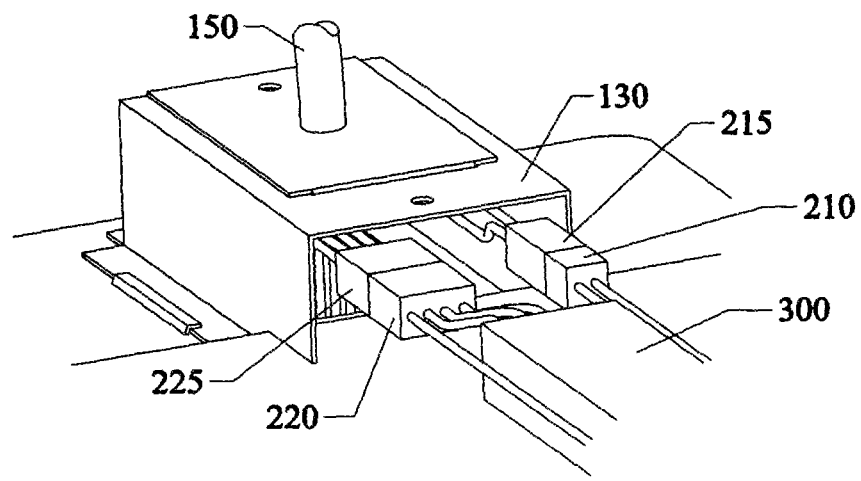
Fig.10

Project Resource Comparison: Replacing a Ballast

| Steps | Traditional Ballast Assembly* | ARC Ballast* |
|---|---|---|
| 1: Ladder | Yes | Yes |
| 2: Removing occupants | Yes | Yes |
| 3: Removing 2 bulbs | Yes, carefully not to disturb filaments | Not necessary |
| 4: Remove access cover | Yes, ballast cover | Yes, Ceiling tile** |
| 5: Unplug connectors | Yes, 1 (Power) | Yes, 2 (power and lamps). Done during step 7 |
| 6: Removing wire nuts | Yes, 6 wire nuts | Not necessary |
| 7: Remove ballast | Yes, remove gounding screw, holding on the ballast that it does not drop on contents below (mounted upside down) | Yes, remove grounding screw, slide ballast out, disconnect 2 connectors and remove (located on top of fixture)*** |
| 8: Mount new ballast | Yes same cautions apply | Yes, attach connectors and pinch on cover, insert slack wiring into docking station cover, slide ballast into station cover, fix ballast cover with grounding screw |
| 9: Reterminate new wire nuts | Yes, 6 wire nuts | Not necessary |
| 10: Plug connector | Yes, 1 (Power) | Yes, 2 (power and lamps). Done during step 7 |
| 11: Install access cover | Yes | Yes* |
| 12: Reinstall 2 bulbs | Yes | Not necessary |
| 13: Install replacement bulb | Yes if filaments were disturbed | Not necessary |
| 14: Certified installer | Yes, Electician or Journeyman | Not necessary |
| 15: Total project time | 1 hour | 5 minutes |

* Utilizing the now-mandatory power disconnect modification. Power is on for both examples.
** Many industrial and commercial sites have fixtures suspended from an open ceiling. Ballast replacement in these installations consist of simply disconnecting the old and reconnecting the replacement ballast.
*** Ballast is docked to mounting plate, which is located on top of fixture. Danger of dropping ballast is minimal.

Fig. 17

QUICK CHANGE LAMP BALLAST ASSEMBLY

This application is a continuation of PCT Application No. PCT/US08/00264 filed Feb. 28, 2008.

FIELD OF THE INVENTION

This invention relates to lamps and, in particular, to methods, apparatus and systems for a quick change lamp ballast assembly for a lamp fixture.

BACKGROUND AND PRIOR ART

Fluorescent lamps require relatively high starting voltages, and in many cases electrode heating. These are supplied by a combination of transformer coils, capacitors and solid state electronics, all usually potted together in a metallic enclosure commonly known as a "ballast". The modern electronic ballasts have much smaller, lighter coils and relatively much more extensive electronic circuitry. These electronic ballasts may be potted, or their components may be coated only lightly, or have no coating at all.

A typical indoor fluorescent-lamp fixture or luminaire is an elongated, narrow structure with an even narrower, shallow casing that extends the length of the fixture for mounting of fluorescent-lamp sockets and for housing of the ballast and the fixture wiring. The ballast usually fits within or upon, one of these narrow, shallow casings and is thus usually made relatively long, narrow and shallow. The ballast has its own enclosure, usually made of two sheet-metal pieces. One piece is die-cut and then bent to provide two generally vertical side walls, a generally horizontal floor, and conventionally a vertical wall at each end of the enclosure respectively. A second, flat piece (with mounting holes for attachment to the casing) forms a separate cover plate.

General practice in the fluorescent-lighting industry for more than a half century has been to provide wires that extend from within the ballast through a grommet or strain relief in each end wall, respectively. Some of these wires connect with a lamp socket mounted at each end of the lamp fixture, respectively; and others of the wires connect with the input power leads.

The ballast wires sometimes are made the correct length to just reach the sockets in some particular lamp model, and sometimes are made shorter, for attachment to other wires— often called the "wiring harness" which then extends the remaining distance to the sockets. Representative patents exemplifying this standard configuration include U.S. Pat. No. 2,489,245 to Sola, U.S. Pat. No. 2,595,487 to Runge, U.S. Pat. No. 3,360,687 to Riesland, and U.S. Pat. No. 3,655,906 to Robb.

Adherence to this basic form of ballast wiring has remained dominant in the industry despite issuance of many patents proposing seemingly reasonable variations. U.S. Pat. No. 2,487,468 issued in 1949 to Shirley R. Naysmith for one such variation in which the wires from each end of the ballast terminate in respective half-connectors that plug directly into mating half-connectors in lamp-socket assemblies, at the ends of the fixture.

The Naysmith patent discloses wiring within the luminaire that is completed by plugging together the cable-carried receptacles to the fixed lamp holders" so that fixture assembly would be rendered so easy that ballast units may be completed and pretested by the ballast manufacturer, the lamp holders by the lamp holder manufacturer, and shipped to the installation location in suitable lots without passing through the factory of the fixture manufacturer. Naysmith's device is not a "leadless" ballast.

U.S. Pat. No. 3,514,590 issued to Shaeffer discloses a leadless ballast that plugs into a printed-circuit board that replace both the casing and the wiring of a fluorescent-lamp fixture with the lamp sockets and the plug-in ballast supported at the underside of the printed-circuit board. Shaeffer's objective was that the entire fixture be amenable to assembly quickly and without the use of tools.

U.S. Pat. No. 3,569,694 issued Comer describes a ballast-can cover plate that is extended longitudinally beyond one end wall of the can, and an array of laterally oriented connector pins fitted to a vertical bracket on the base plate extension. Short wires are passed to these pins through the end of the ballast can and the pins are mated with mating contacts mounted to the casing of the fixture. This unit is almost leadless.

The plug-in concept was carried an extreme in U.S. Pat. No. 4,674,015 issued to Smith, which teaches that the entire ballast should be plugged bodily sideways into a large receptacle in the casing. In Smith's leadless design, contact tabs on the interior wall of the receptacle engage mating contact tabs on the side wall of the ballast can.

U.S. Pat. No. 4,729,740 issued to Crowe shows a small printed-circuit board within the ballast can and supporting all the other components in the can. In particular the internal circuit board a respective electrical connector at each end for attachment of several individual leads of a wiring harness leading to each end of the fixture. Crowe's ballast is also a leadless configuration.

The ballast disclosed in U.S. Pat. No. 4,277,728 has a full-length circuit board generally analogous to Crowe's but mounted to a flat plate that becomes the cover, rather than to the U-shaped body. It also has a second board that is much shorter and mounted vertically to the full-length board. The ballast is not potted, although some of the components are individually dipped and the ballast has various other features including a connection for computerized control, and a manual dimmer control.

Another leadless ballast design that uses an internal connector is disclosed by Burton et al. in U.S. Pat. No. 4,916,363 has an internal connector that receives the wiring-harness wires either individually or in a connector-like carrier that organizes the wires into an array, but the internal connector is not mounted in the picture-frame style as in Crowe. Instead the internal connector is mounted in a transverse slot that extends all the way across the width of the bottom of the can, about a quarter or a third of the distance along the can from one end. At the side of the internal connector which faces toward that nearer end, the bottom of the can is formed in a shallow bevel that makes the connector face accessible for insertion of the wires.

U.S. Patent No. 5,350,316 discloses fluorescent-lamp leadless ballast with an improved connector. The half-connector body has lateral ears that fit in small notches in the ends of the side walls of a ballast can. An end wall traps the ears longitudinally in the notches to enhance tight longitudinal fit. Outside the ballast, in a new fixture, a jack slides freely in the receptacle to make wiring-harness connections. In either the jack or receptacle, cylindrical female contacts mate with bared ends of standard fixture wires held in the opposite half connector, serving as pin contacts. When the female contacts are in the jack, a person may replace conventional ballasts with this new one, by cutting and baring the old harness wires and inserting them individually into the receptacle. Alternatively, for field retrofit a jack can be supplied, e.g. with poke-in wiring.

The prior art addresses various methods of adapting a connector to the ballast for the purposes of quickly changing the wiring, yet the mechanical process of replacing the ballast is still a slower task, as the physical location of the ballast is still within the inner space of the lamp fixture. Nor does the prior art address the issue of waste heat generated by the ballast, which the new invention addresses by locating the ballast in the plenum space above the lamp fixture, and thermally isolating the ballast from the fixture while still remaining electrically grounded to the chassis.

In the existing architecture of a fluorescent lighting fixture, the lamp ballast is physically, electrically, and thermally attached to the interior of the light fixture. No wire harness is used, requiring semi-permanent methods of lamp and power wire. Typically wire connections are done with plastic wire nuts for input power and ballast leads are directly connected to lamp holders. To gain access to the lamp ballast for the installation and removal of the lamp ballast it requires the removal of the lamp fixture lens or outer louver, usually at least one light tube and ballast covering plate. Many sites and local codes require specialists for the repair. The physical replacement process is cumbersome and time consuming. The replacement further impacts the owner with relatively expensive repair costs and reduced productivity.

The lamp ballast is located on the human occupied, or air-conditioned, side of the light fixture and not on the side that is exposed to the plenum space. This combined with the fact that the ballast is thermally connected to the light fixture, causes most of the heat generated by the ballast to be directed to the conditioned space. HVAC designers account for this heat by increasing air conditioning capacity.

What is needed is a lamp ballast as either a retrofit to existing lamp fixtures or as a change to newly manufactured lamp fixtures that is easily installed and replaced while reducing the amount of generated heat that is transferred into the living space.

SUMMARY OF THE INVENTION

A primary objective of the invention is to provide methods, apparatus and systems for a lamp ballast that can be quickly replaced for use either as a retrofit to existing lamp fixtures, or as a change to newly manufactured lamp fixtures, which reduces the labor costs in replacing the ballast.

A secondary objective of the invention is to provide methods, apparatus and systems for a lamp fixture with the ballast located so that the waste heat generated by the ballast is thermally isolated or reduced from the lamp fixture, which reduces the amount of waste heat spread in to the air-conditioned living space.

A third objective of the invention is to provide methods, apparatus and systems for a lamp ballast to adapt or manufacture quick change ballast assemblies, which will allow for reduced overall cost of operation for the lamp fixture.

A fourth objective of the invention is to provide methods, apparatus and systems for removing the ballast from inside the light fixture and placing the lamp ballast above the light fixture (in the plenum space) so the heat generated by lamp ballast is vented into the plenum space. The ballast-mounting fixture provides adequate heat sinking in order to direct the heat generated by the lamp ballast into the plenum space.

A fifth objective of the invention is to provide methods, apparatus and systems for placing the lamp ballast in its own mounting fixture with auto connect wiring harness, the ballast installation and replacement process is improved. The quick connect and disconnect ability reduces the time and knowledge level of the service provider, reducing overall Operations and Maintenance costs. Significant reductions in repair times also equate to less owner disruption, thereby improving worker productivity.

A first preferred embodiment of the invention provides a lamp ballast assembly 100 for use with a fluorescent lighting fixture. The lamp ballast assembly includes a ballast mounting fixture 110 for housing a lamp ballast 300, a wire connection fixture 130 for housing a lamp wiring connector 220 and a power connector 210, a mounting plate 120 for removably attaching the ballast mounting fixture 110 and wire connection fixture 130, the mounting plate 120 having an opening to route a lamp harness wiring into the wire connection fixture 130, and a fastener for attaching the mounting plate 120 to the fluorescent lamp fixture.

A second embodiment provides a method for replacing an existing lamp ballast with a quick change ballast assembly in a lamp fixture. The method includes removing an existing whip plate from the existing lamp fixture, installing the mounting plate into an opening where the existing whip plate was removed, installing the wire connection covering fixture on the mounting plate, securing the mounting plate and the wire connection covering fixture to a lighting fixture chassis, routing a power cable and a wiring harness into the wiring connection covering fixture, attaching the removed whip plate on the wiring connection covering fixture, connecting the wire harness to a new ballast in a new ballast mounting fixture, and attaching the ballast mounting fixture onto the installed ballast mounting plate.

A third embodiment provides a method for replacing a failed ballast in a lamp fixture having a quick change ballast assembly. The replacement method includes detaching a non operable ballast mounting fixture from the mounting plate, disconnecting the wire harness from connection covering fixture, removing the non operable ballast mounting fixture from the mounting plate, connecting a replacement ballast mounting fixture to the wire harness, and re-attaching the ballast mounting fixture on the installed mounting plate.

Further objects and advantages of this invention will be apparent from the following detailed description of preferred embodiments which are illustrated schematically in the accompanying drawings.

BRIEF DESCRIPTION OF THE FIGURES

FIG. 9 is an internal side perspective view of the wiring connections within the wire connection fixture.

FIG. 10 shows another perspective view of the wiring connection showing the lamp wire connector and the ballast power connection.

FIG. 17 is a table comparing that steps required for changing a prior art ballast to the steps required to change the novel ballast assembly of the present invention.

DESCRIPTION OF THE PREFERRED EMBODIMENTS

Figure 1:
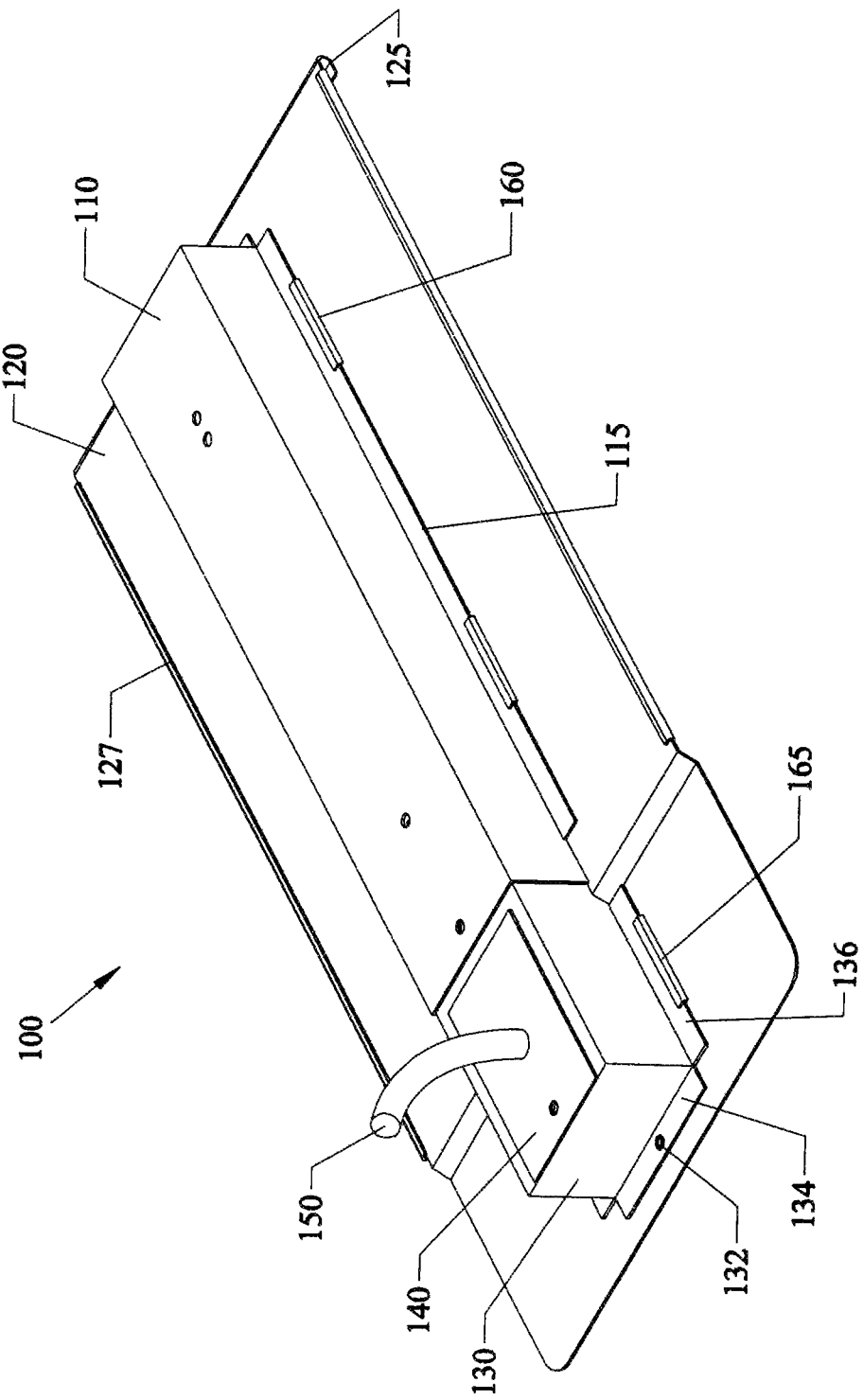
FIG. 1 is a perspective top view of a lamp ballast according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

100 quick change lamp ballast assy.
110 ballast mounting fixture
115 ballast fixture side flange
120 mounting plate
125 end rim
127 side rim
130 wire connection covering fixture
132 wire fixture mounting screw
134 wire fixture front flange
136 wire fixture side flange
140 whip plate
150 power calbe
155 power wiring
160 ballast fixture tab
165 wiring fixture tab
210 ballast power connector
215 facility power connector
220 ballast wire connector
225 lamp harness wiring connector
300 ballast
1000 lamp ballast assembly
1010 ballast mounting fixture The method, system, apparatus and device of the present invention relates to the ceiling fluorescent light fixtures, which feature lamp ballasts that are powered by AC voltage and control the lighting of the bulbs. In the prior art configurations the lamp ballast is physically, electrically, and thermally attached to the interior of the light fixture. Because no wire harness was used, the prior art configurations required semi-permanent methods of wiring. Typically this has been done with a plastic wire nut for input power and ballast leads are directly connected to lamp holders. The installation and removal of the lamp ballast requires the removal of the lamp fixture lens, ballast covering plate, and usually at least one light tube. This process can become cumbersome and time consuming.

The lamp ballast is located on the human occupied side of the light fixture and not on the side which is exposed to the plenum space. This combined with the fact that the ballast is thermally connected to the light fixture, causes most of the heat generated by the ballast to be directed to the human occupied space. Additional air conditioning capacity is required to offset this generated heat.

The present invention is a quick connect lamp ballast assembly which allows fast replacement of inoperable lamp ballast, and also has the benefit of isolating the thermal coupling between the ballast and the light fixture to reduce the heat load in the occupied space. The assembly can be applied to newly manufactured lamp fixtures, or as a retrofit kit for existing lamp fixtures.

Figure 2:
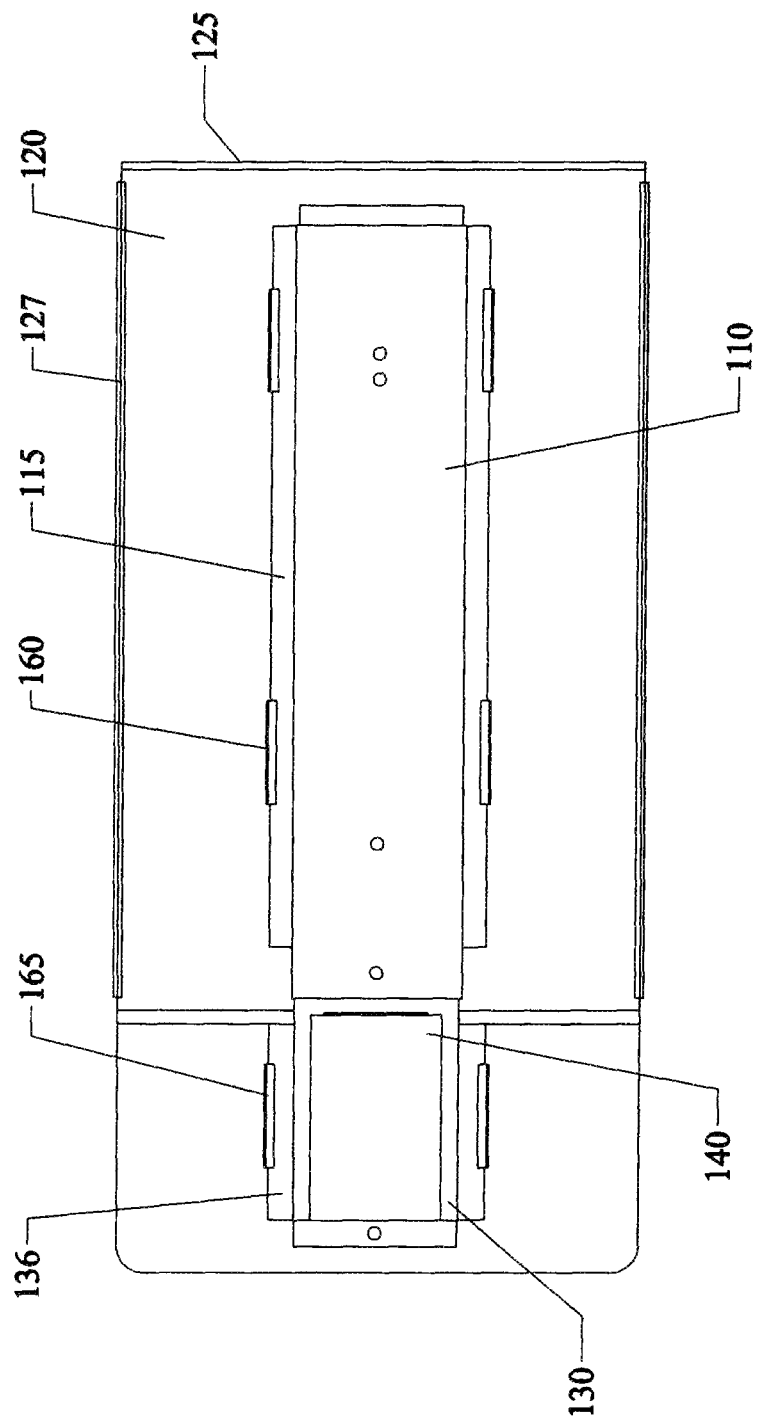
FIG. 2 is a top plan view of the lamp ballast shown in FIG. 1

The most significant feature provided by the new lamp ballast assembly is the ability for quick connect and disconnect. FIG. 1 is a perspective top view of the quick change lamp ballast assembly according to the present invention and FIG. 2 is a top plan view of the lamp ballast assembly shown in FIG. 1. As shown, the lamp ballast assembly 100 includes a mounting plate 120 on which the ballast mounting fixture 110 and the wire connection covering fixture 130 are removably mounted. The mounting plate 120 includes ballast tabs 160 and wiring fixture tabs 165 that protrude from the upper surface of the mounting plate 120 to allow the ballast mounting fixture 110 and the wire connection covering fixture 130 to securely slide into place without the use of tools.

Figure 6:
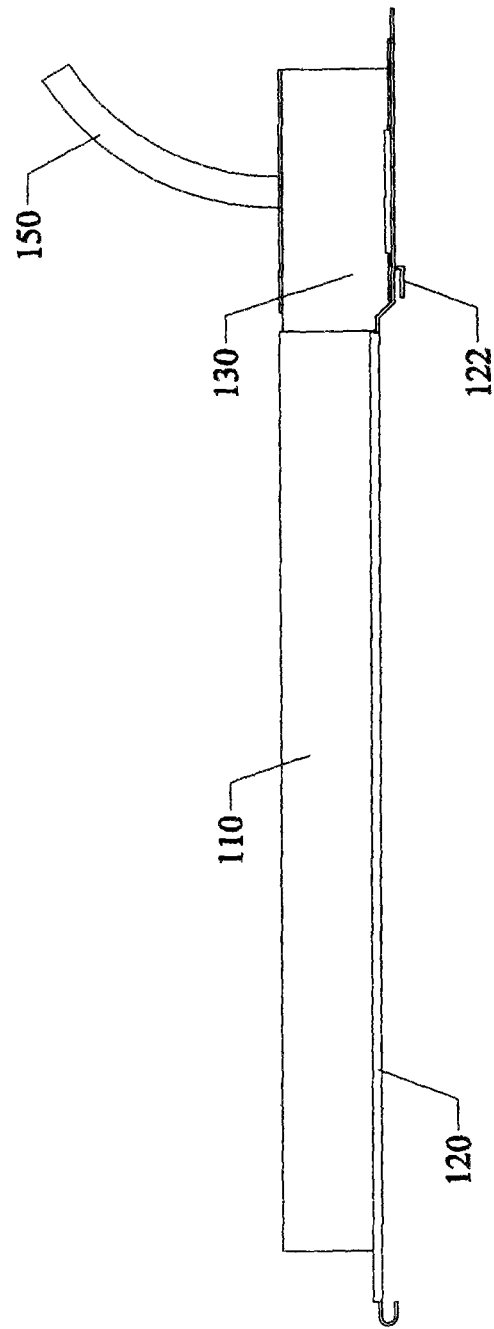
FIG. 6 is a side view of the ballast mounting fixture coupled with the wire connection covering fixture with both mounted on the mounting plate.

The mounting plate has two areas, one area for mounting the ballast mounting fixture 110 and a second area for mounting the wire connection covering fixture 130. In a preferred embodiment, the mounting plate 120 is bent as shown in FIG. 6 to form an upper and a lower level. With this configuration, the distance the wire connection covering fixtures 130 slides it limited. Additionally, the mounting plate 120 bend serves as a ballast standoff by purposefully introducing an air space below the mounting plate. This air space will reduce ballast thermal conduction to the attached fixture and further encourage ballast cooling into the plenum space. As shown, the wire connection covering fixture 130 may include a mounting screw 132 in the wire fixture front flange 134 for securely mounting the covering fixture 130 to the mounting plate 120. With the wire connection covering fixture 130 securely fastened, the ballast mounting fixture 110 is slid at least partially into place for connecting the ballast wiring 225 and power wiring 155 (shown in FIG. 8). Once connected, the ballast mounting fixture 110 is slid forward until the end of the ballast mounting fixture 110 mates with the end of the wire connection covering fixture 130.

Figure 7:
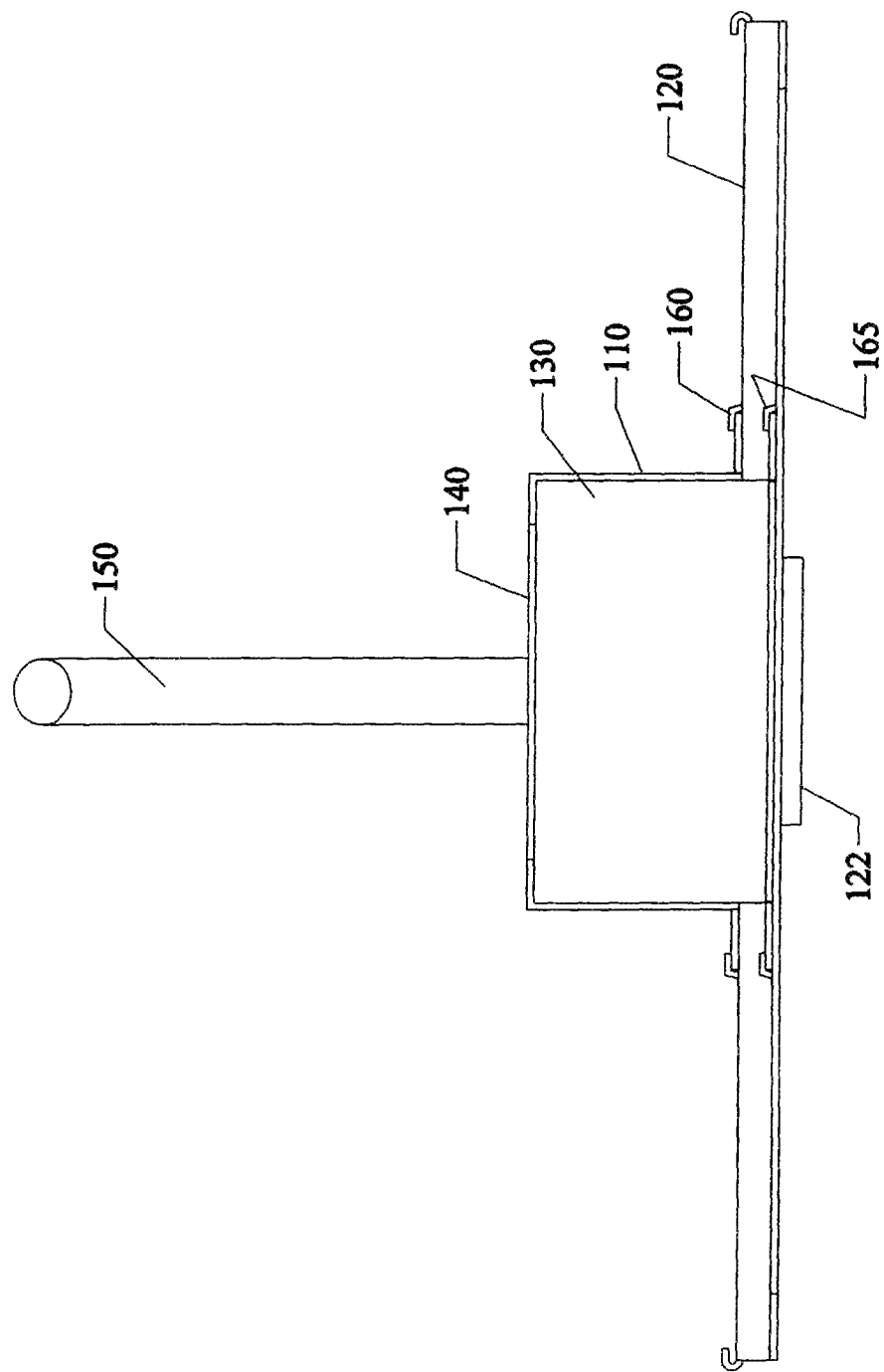
FIG. 7 is a side view of one end of the wire connection covering fixture mounted on the mounting plate.

Referring back to FIG. 6, in an embodiment, the mounting plate 120 also includes a lower tab 122 protruding from the bottom surface of the mounting plate 120 for securing the mounting plate 120 into the opening created by removing the whip plate 140 from the lamp fixture (not shown). On the opposite end of mounting plate 120 is a downwardly curved end rim 125 which serves as a standoff to permit air flow between the lamp fixture (not shown) and the mounting plate 120. FIG. 7 is a side view of the end of the ballast assembly 100 showing the wire connection fixture 130 secured on the mounting plate 120 and showing the bottom tab 122 protruding from the bottom of the mounting plate 120. Alternatively, the mounting plate 120 is attached to the lamp fixture with a fastener, such as a screw.

Figure 3:
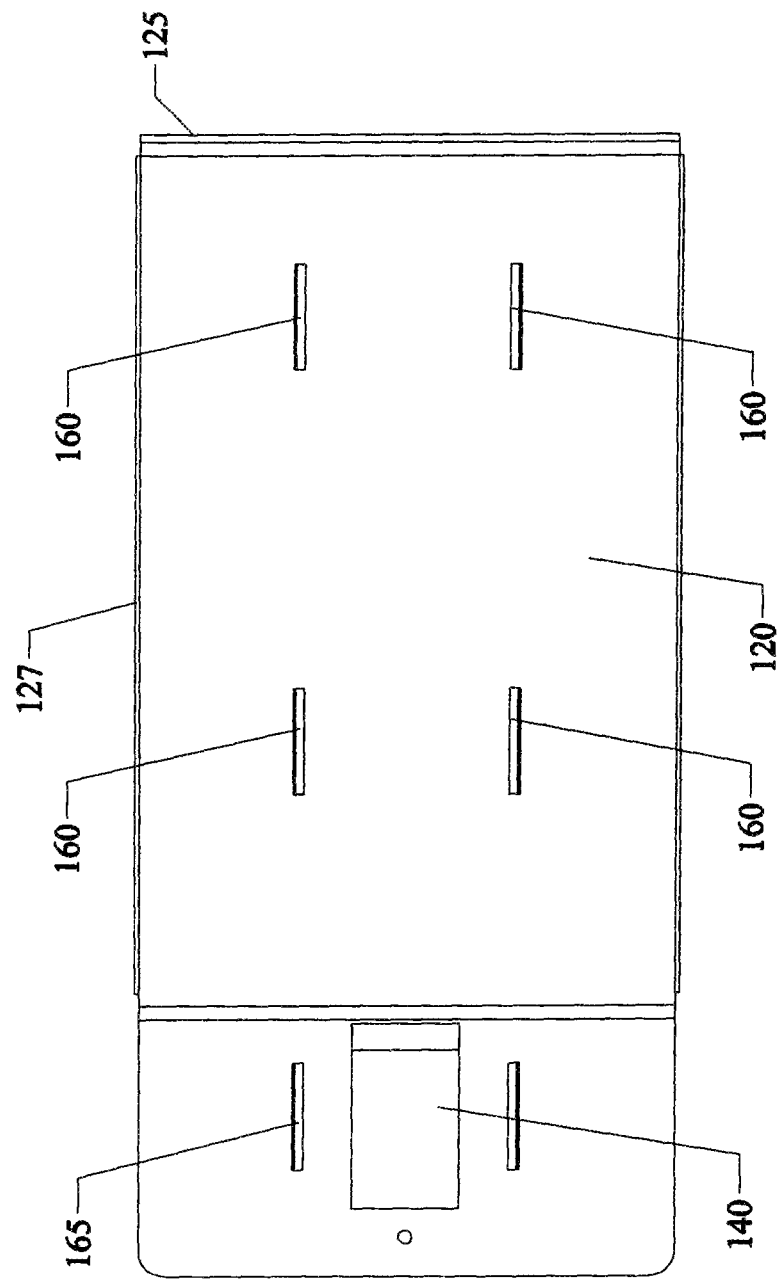
FIG. 3 is a top plan view of the mounting plate according to the present invention.
Figure 4:
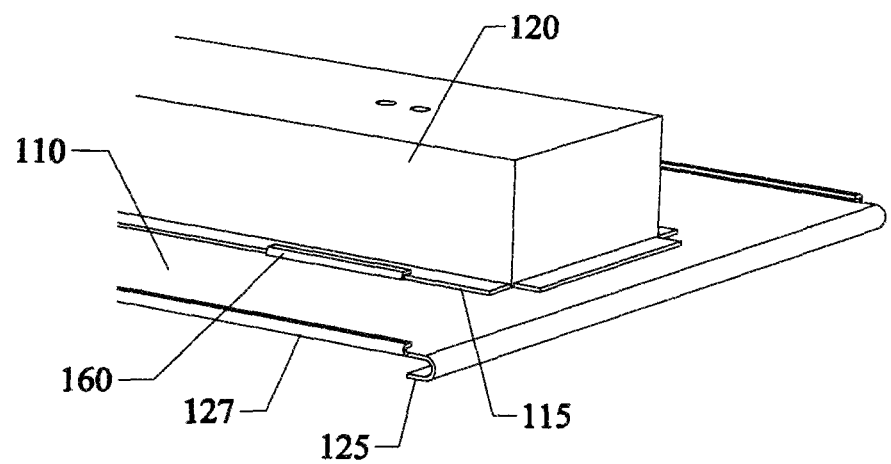
FIG. 4 is a side view of one end of the mounting plate shown in FIG. 3.
Figure 5:
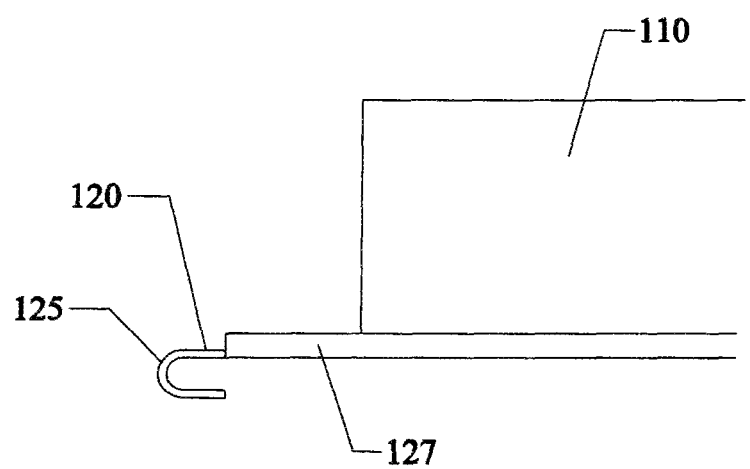
FIG. 5 is an exploded side view of one end of the mounting plate shown in FIG. 4.

FIG. 3 is a top view of a preferred embodiment of the mounting plate 120. As shown, the ballast fixture tabs 160 are projecting offsets to allow the ballast fixture to be replaced without the use of tools. The mounting plate 120 also includes a downward curved end rim 125 and upward curved side rims 127 as shown in FIG. 4 and FIG. 5. The mounting plate 120 also includes wire fixture tabs 165 that are also projecting offsets for securing the wire connection covering fixture 130 to the mounting plate 120.

Figure 8:
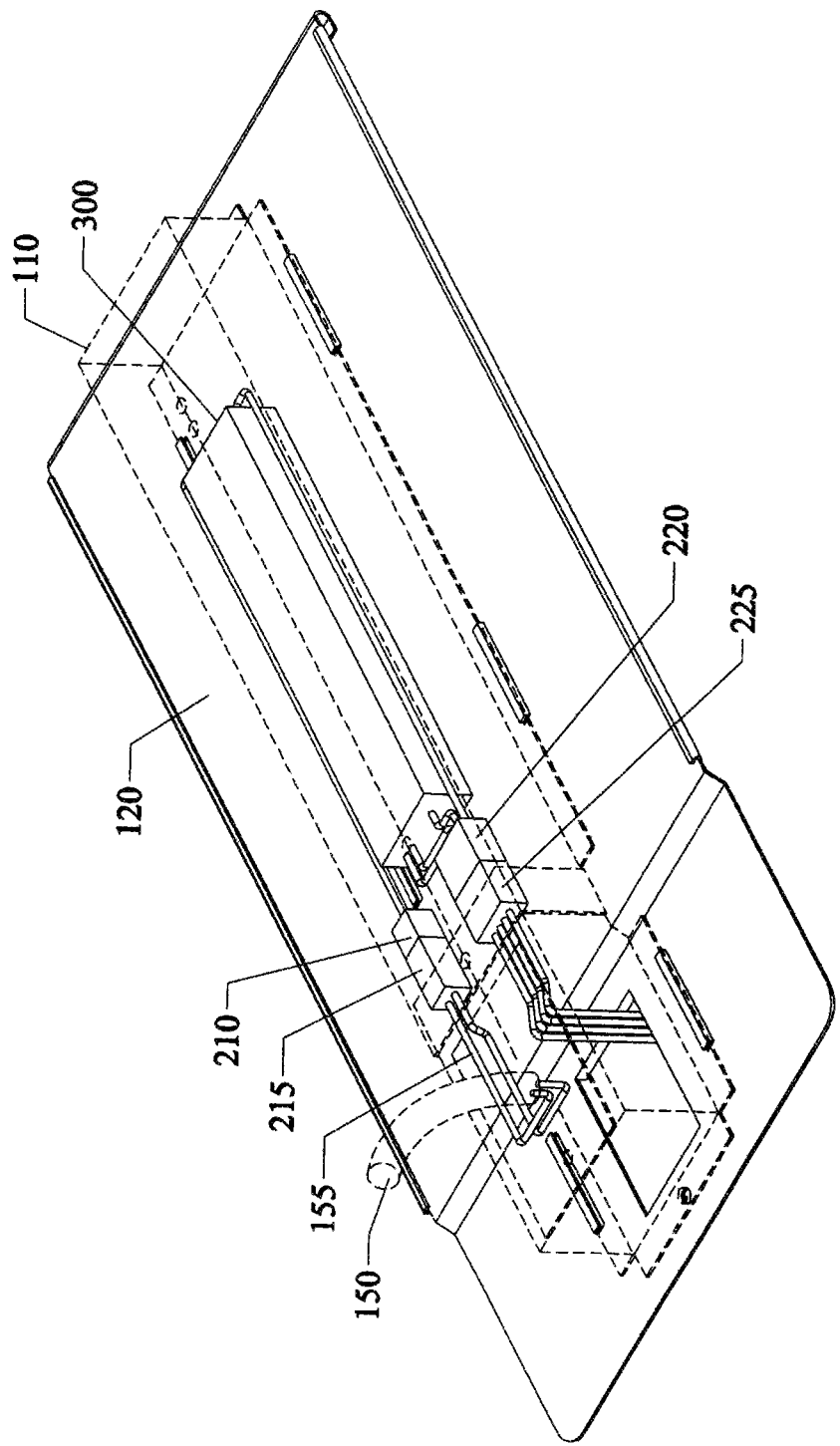
FIG. 8 shows the electronics housed within the ballast mounting fixture and the wire connection covering fixture.

By placing the lamp ballast 300 in its own mounting fixture 110 as shown in FIG. 8 with a wiring harness 225, the ballast installation and replacement process is a quick change. In addition, placing the lamp ballast above the light fixture in the plenum space allows the heat generated by lamp ballast to be vented into the plenum space. The ballast mounting fixture 110 provides adequate heat sinking in order to direct the heat generated by the lamp ballast 300 into the plenum space.

Referring to FIGS. 8, 9 and 10, the wire connection covering fixture 130 mates to the mounting plate 120 and provides an opening for mating with the whip plate 140, which carries the AC power lines 150. Housed within the wire covering fixture 130 is the lamp wire connector 225 and the ballast power connector 215 shown in FIGS. 9 and 10. The lamp wire connector 225 and ballast power connectors 215 are connected to the matching connectors 220 and 210 respectively, from ballast 300 and allow for the ballast to be quickly removed and replaced without changing any of the wiring of the lamp fixture. In order to change defective or failed ballast, the ballast mounting fixture 110 is unscrewed from the mounting plate 120 and then the ballast 300 lamp wire connector 120 and power connector 110 are disconnected. After the replacement ballast mounting fixture is partially mounted on the mounting plate 120, the ballast lamp wire connector 220 and power connector 210 in the wire connection covering fixture 130 are connected to the new ballast 300 housed in the ballast mounting fixture 110 and the ballast mounting screw is replaced to secure the ballast mounting fixture 110 to the mounting plate 120.

Figure 12:
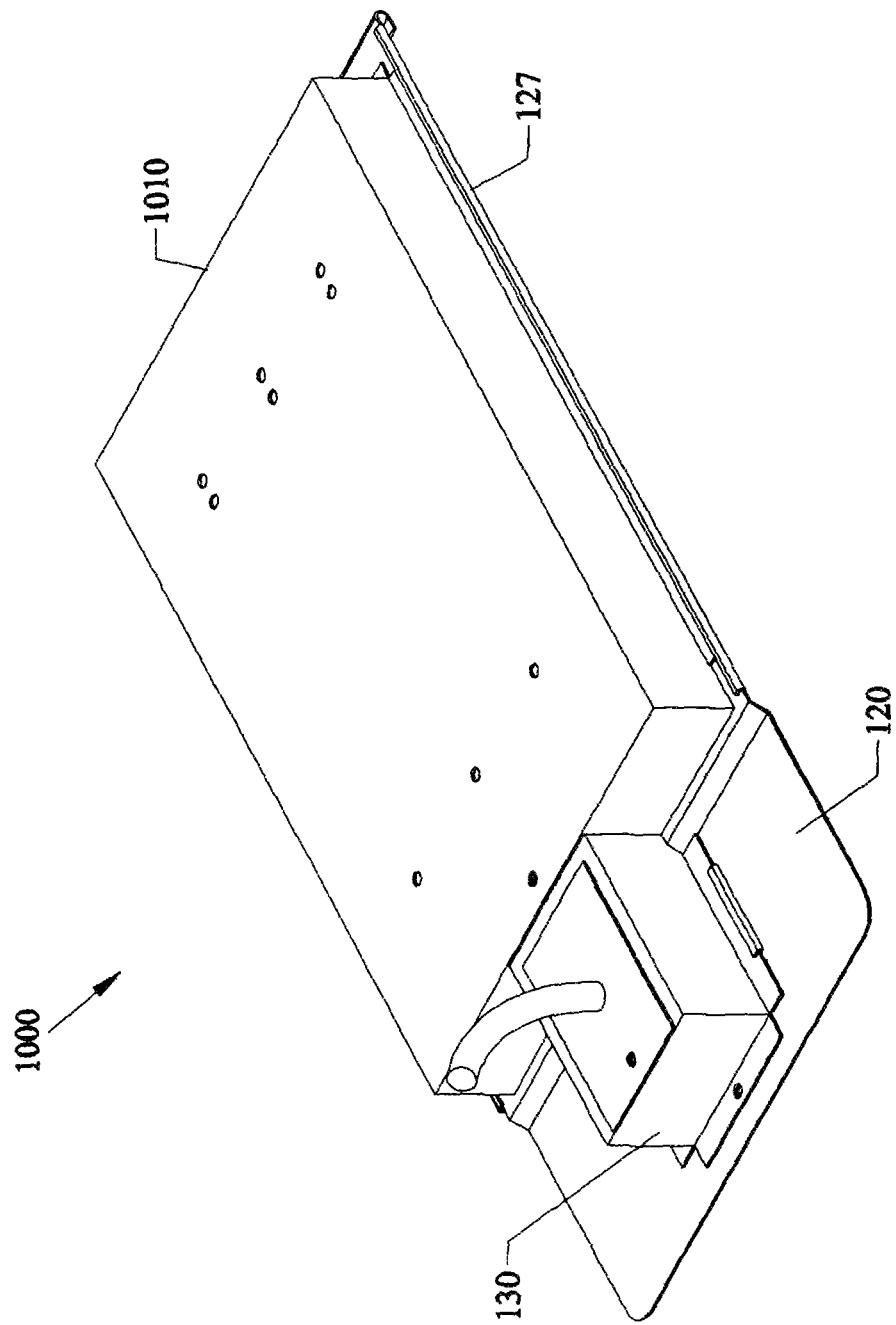
FIG. 12 is a top perspective view of another embodiment of the lamp ballast according to the present invention.
Figure 13:
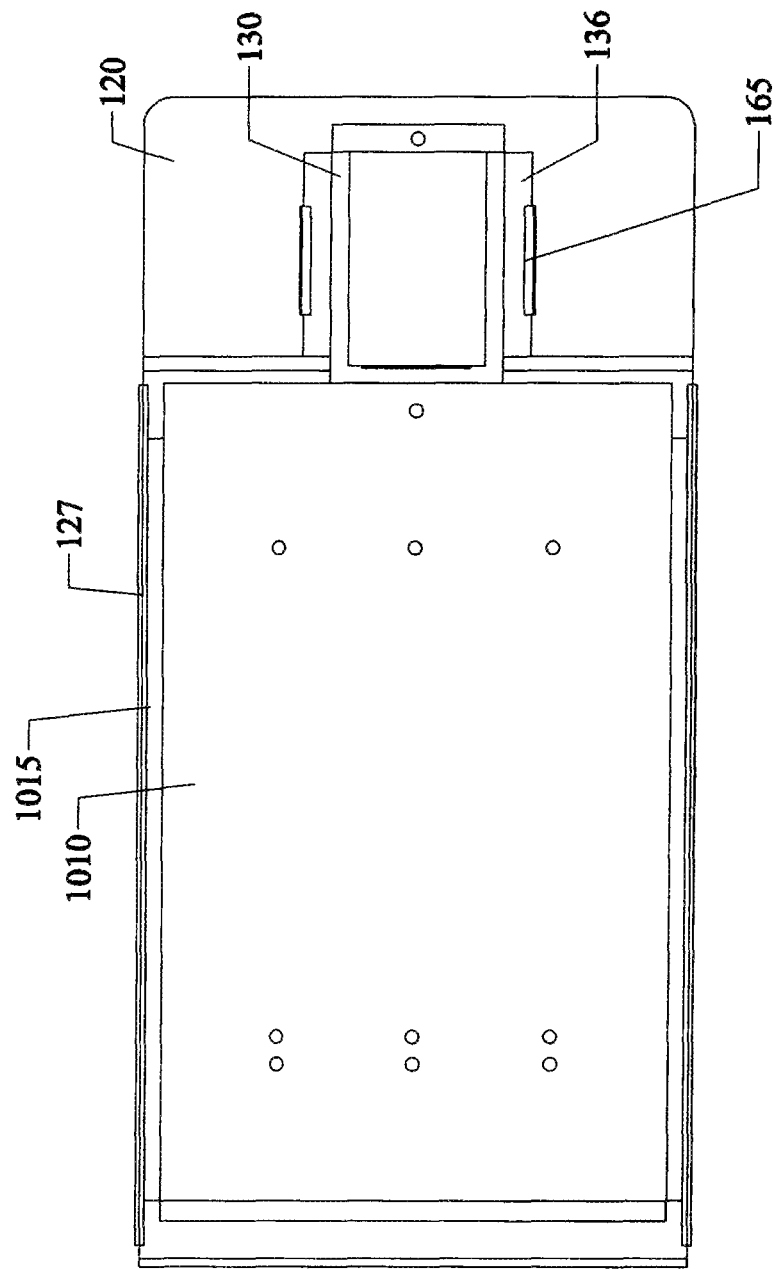
FIG. 13 is a top plan view of the lamp ballast shown in FIG. 12.

FIGS. 12 and 13 show an alternative embodiment of the quick change lamp ballast assembly 1000. FIG. 12 is a top perspective view of another embodiment of the lamp ballast according to the present invention and FIG. 13 is a top plan view of the lamp ballast shown in FIG. 12. In this embodiment, the ballast mounting fixture 1010 housing the ballast is larger but is still mounted on the mounting plate 1020. As shown in FIGS. 4 and 5, the longitudinal length of the mounting plate 120 is curved upward to form upward curved side rims 127 for restraining the alternative ballast mounting fixture 1010. Referring to FIG. 13 in conjunction with FIG. 4, the ballast mounting fixture 1010 is installed on the mounting plate 120 by sliding the ballast flanged edge 1015 under the side rim 127 of the mounting plate 120.

Figure 14:
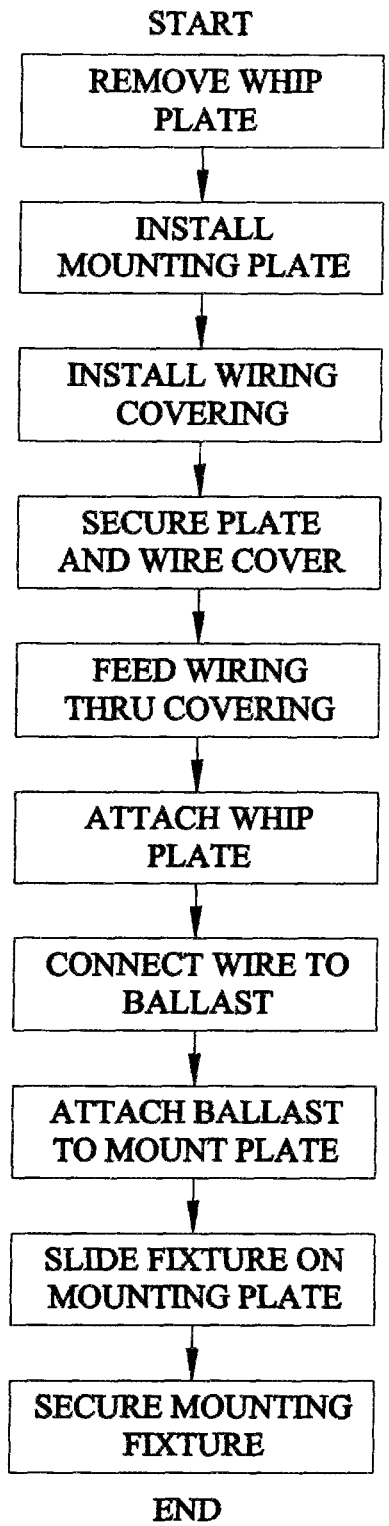
FIG. 14 is a flow diagram showing the steps for installing the quick change lamp ballast assembly according to the present invention.
Figure 15:
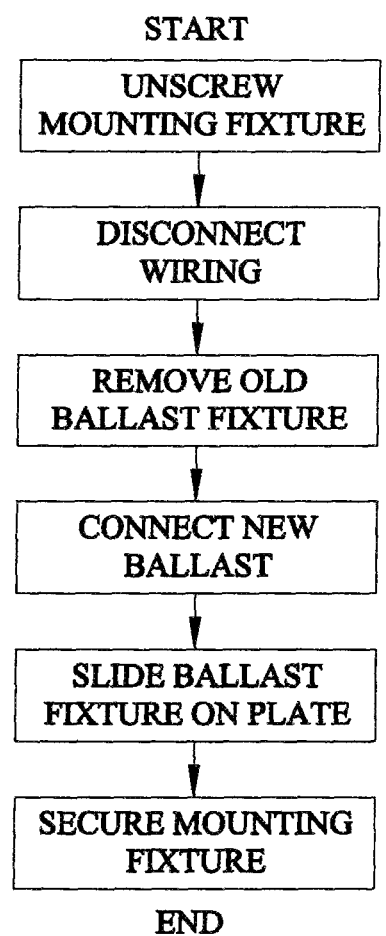
FIG. 15 is a flow diagram of steps for adapting the quick change ballast to an existing lamp.

FIGS. 14 and 15 are flow diagrams of the retrofit and replacement process, respectively, for both embodiments. Referring to FIG. 14, the process for adapting the quick change lamp ballast assembly to an existing lamp begins with removing the wipe plate 149 from the wire connection covering fixture 130. Next, the mounting plate 120 is installed by sliding a securing clip into the opening where the whip plate 140 was removed and the wire connection covering fixture 130 is installed by sliding the flanged edges 136 of the wiring connection fixture 130 into the securing tabs 165 on the mounting plate 120 as shown in FIG. 2. The ballast mounting fixture 110 and the connection covering fixture 130 are each secured with a single screw 132 into the mounting plate 120 as shown in FIG. 1. The screw provides a solid ground connection for the light fixture chassis, mounting plate 120, and wire connection covering fixture 130.

Next, the power wires 150 connected to the ballast power connector 215 coupled with the whip plate 140 are fed through the wire connection covering fixture 130 as shown in FIG. 9 and the whip plate 140 is attached to the opening on the connection covering fixture 130 in the same manner it was originally attached to the light fixture chassis. The ballast power connector 215 is mated with the power connector 210 and the ballast wire connector 220 from the new ballast 300 is connected to the mating lamp harness connector 225 as shown in FIG. 10. Now the new ballast 300 is already to be physically connected to the ballast mounting fixture 120. Referring to FIG. 2, the ballast mounting fixture 110 is slid into the securing tabs 160 on the installed mounting plate 120 and the ballast mounting fixture 110 is secured to the mounting plate 120 with a screw (not shown). The screw provides a solid ground for the ballast 300 and ballast mounting fixture 120.

Figure 11:
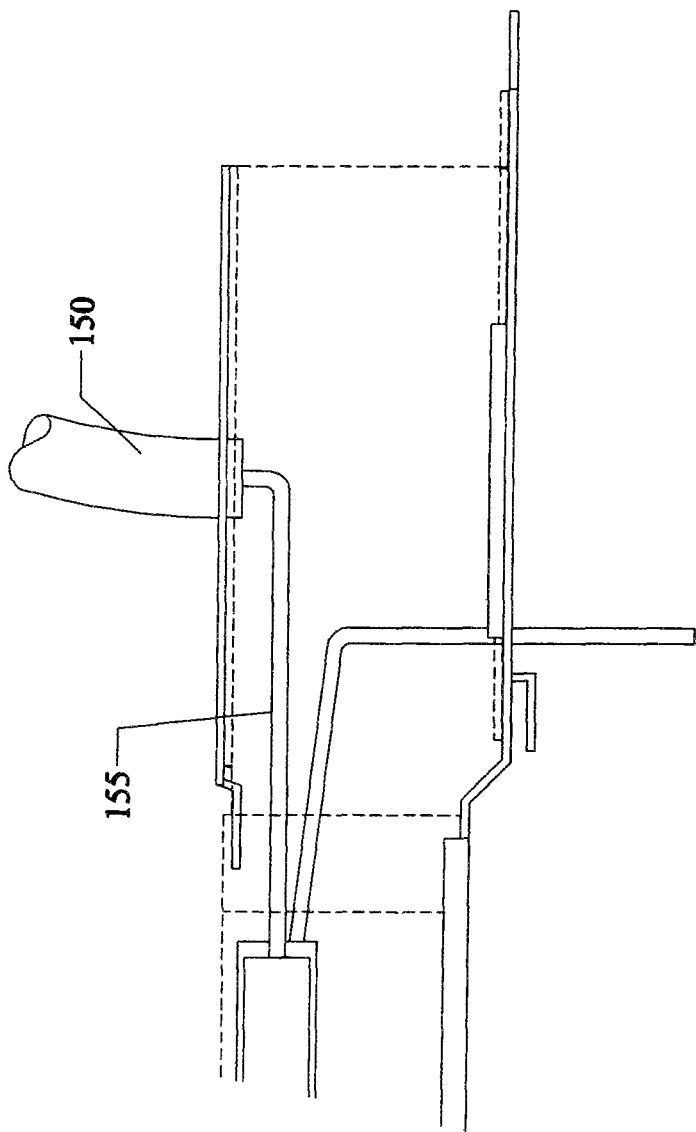
FIG. 11 is a side view showing the lamp wire connector and the ballast power connection.

FIG. 15 is a flow diagram showing the process for replacing the ballast in a lighting fixture having a quick change lamp ballast assembly 100. First the screw securing the ballast mounting fixture 110 to the mounting plate 120 is removed and the ballast mounting fixture 110 is slid a distance to expose the wiring connectors and the power connectors. The lamp harness wire connector 225 and the power connector 215 are disconnected from the mating ballast wiring connector 220 and the ballast power connector 210 in the wire connection covering fixture 130 shown in FIGS. 10 and 11. The old ballast mounting fixture is removed and a new ballast mounting fixture 110 having a new lamp ballast 300 is partially installed to allow lamp harness wire connector 225 and power connector 215 to mate with the ballast wire connector 220 and ballast power connector 210, respectively. Once the cabling is connected, the replacement mounting fixture 110 housing ballast 300 is slid into place on the installed mounting plate 120 with the flanges on the side of the ballast mounting fixture 110 sliding under the ballast fixture tabs 160 as shown in FIG. 2. The replacement is completed by securing the ballast mounting fixture 110 to the mounting plate 120 with a screw.

In summary, the present invention provides anew method, system, apparatus and device for a quick change lamp ballast assembly that allows for the new manufacture or retrofit of lamp fixtures to use the new quick change ballast. This ballast assembly allows for the replacement of a broken ballast to reduce replacement time and labor costs. Another feature of the assembly is that the ballast will be thermally isolated from the lamp fixture, which will reduce the effects of the waste heat from the ballast, and increase overall building efficiency by reducing the cooling load. The new assembly can be installed as a retrofit kit in about the same time it currently takes to install prior art lamp ballast. The time to replace the ballast in a lamp fixture with a quick change lamp ballast assembly is significantly reduced, which is especially significant for large buildings with many lamp fixtures.

Figure 16:
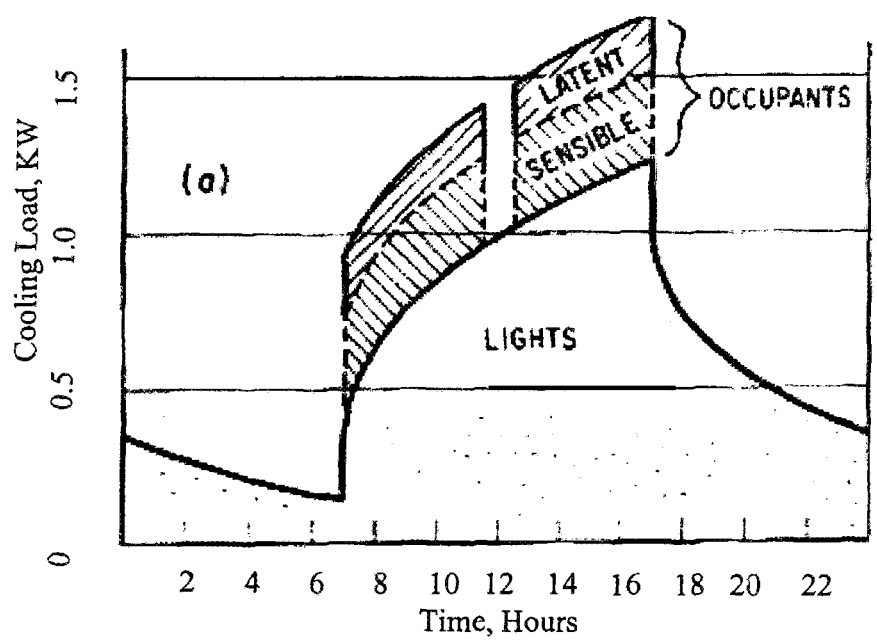
FIG. 16 is a graph showing fluorescent lighting heat as an increasing load as a function of time.

The advantages of replacing a conventional light fixture with a light fixture having a quick change ballast include reduction in heat injected into the room by the ballast, a reduction in steps required to change a failed ballast which is translated to time associated with changing a failed ballast. Fluorescent light heat is an increasing load as a function of time as demonstrated by the graph shown in FIG. 16. The graph is for illustration purpose only, and may vary with different types ballast lighting fixtures.

As shown on the bottom part of the graph in the area identified as "lights", light heat introduced into an approximately 300 square foot room is cumulative and starts warming around 7 AM and starts cooling-off at approximately 6

PM in an office that shuts down and turns lights off at 6 PM. The reason for the increase over time is due to the lighting fixtures and furniture and other objects in the room become heat sinks and also dump heat into the room. A lighting fixture having the quick change lamp ballast assembly according to the present invention is designed to reduce the "Shark fin effect" shown in FIG. 16 by reducing the amount of heat the lighting fixture injects into the room. The quick change ballast assembly of the present invention reduces the "shark fin effect" by locating the ballast in the plenum space above the lamp fixture, and thermally isolating the ballast from the fixture while still remaining electrically grounded to the chassis.

As second important advantage is the reduction in steps required to be performed when replacing a failed ballast which results in a cost saving. The table shown in FIG. 17 compares that steps required for changing a prior art ballast from a conventional fluorescent light fixtures to the steps required to change the novel ballast assembly of the present invention. As shown on the bottom line, the time to change the failed lamp ballast is reduced from approximately 1 hour to approximately five minutes. While the reduction in time to change the ballast translates to a cost saving, the additional cost of requiring an electrician or journeyman to perform the task is also eliminated.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A lamp ballast assembly for use with a fluorescent lamp fixture comprising:
    a ballast mounting fixture for housing a lamp ballast;
    a wire connection fixture for housing a lamp wiring connector and a power connector;
    a mounting plate for removably attaching the ballast mounting fixture and wire connection fixture, the mounting plate having an opening to route a lamp harness wiring into the wire connection fixture, the ballast mounting fixture and mounting plate comprising:
        a first and second ballast mounting flange extending along the longitudinal side of the ballast mounting fixture approximately perpendicular to the longitudinal side; and
        a first and second ballast tab protruding from an upper surface of the mounting plate for restraining the first and second ballast mounting flange; and
    a fastener for attaching the mounting plate to the fluorescent lamp fixture.

2. The assembly of claim 1, wherein the wiring connection covering fixture and mounting plate further comprise:
    a first and second wiring fixture flange extending along the longitudinal side of a bottom of the wiring connection covering fixture approximately perpendicular to the longitudinal side; and
    a first and second wiring fixture tab protruding from an upper surface of the mounting plate for restraining the first and second wiring fixture flange.

3. The assembly of claim 1, wherein the mounting plate comprises:
    at least two ballast fixture tabs for removably installing the ballast mounting fixture to the mounting plate; and
    at least two wiring fixture tabs for removably installing the wiring fixture to the mounting plate.

4. The assembly of claim 1, wherein the wire connection fixture comprises:
    a whip plate for feeding a facility power cable into the wire connection fixture for mating a ballast power connector with a facility power connector to supply an electrical power to the ballast.

5. The assembly of claim 1, wherein the ballast mounting fixture comprises:
    a base having at least one flanged edge for mounting the base on the lamp fixture;
    at least two wiring fixture flanges for removably attaching the wire covering fixture to the base; and
    at least two ballast fixture flanges for removably attaching the ballast mounting fixture to the base.

6. The assembly of claim 1, further comprising:
    a set of installation instructions for retrofitting an existing lamp fixture with the quick change lamp ballast assembly; and
    a set of ballast replacement instructions for replacing a failed ballast in the existing lamp fixture having an existing quick change lamp ballast assembly.

7. The assembly of claim 6, wherein the set of installation instruction comprises:
    a first instruction for removing an existing whip plate from the existing lamp fixture;
    a second instruction for installing the mounting plate into an opening where the existing whip plate was removed;
    a third instruction for install the wire connection fixture on the mounting plate;
    a fourth instruction for securing the mounting plate and the wire connection fixture to a lighting fixture chassis;
    a fifth instruction for routing a power cable and a lamp wiring harness into the wire connection fixture;
    a sixth instruction for attaching the removed whip plate on the wire connection fixture;
    a seventh instruction for connecting the lamp wiring harness to a new ballast in a new ballast mounting fixture; and
    an eighth instruction for attaching the ballast mounting fixture onto the installed ballast mounting plate.

8. The assembly of claim 6, wherein the set of ballast replacement instructions comprises:
    a first instruction for detaching a non operable ballast mounting fixture from the mounting plate;
    a second instruction for disconnecting a lamp wire harness from the wire connection fixture;
    a third instruction for removing the non operable ballast mounting fixture from the mounting plate;
    a fourth instruction for connecting a replacement ballast mounting fixture to the lamp wire harness; and
    a fifth instruction for re-attaching the ballast mounting fixture on the installed mounting plate.

9. A method for replacing an existing lamp ballast with a quick change ballast assembly in a lamp fixture comprising the steps of:
    removing an existing whip plate from the existing lamp fixture;
    installing the mounting plate into an opening where the existing whip plate was removed;
    installing the wire connection covering fixture on the mounting plate;
    securing the mounting plate and the wire connection covering fixture to a lighting fixture chassis;
    routing a power cable and a wiring harness into the wiring connection covering fixture;

attaching the removed whip plate on the wiring connection covering fixture;

connecting the wire harness to a new ballast in a new ballast mounting fixture; and attaching the ballast mounting fixture onto the installed ballast mounting plate.

10. The method of claim 9, wherein the step of installing the mounting plate comprises the step of:

sliding a securing clip integral to the mounting plate into an opening exposed by removing the existing whip plate.

11. The method of claim 9, wherein the step of installing the wire connection covering comprises the steps of:

sliding a wiring fixture side flange into a securing wiring tab on the mounting plate; and removably fastening the wiring connection covering fixture to the mounting plate with a fastener to provide a ground connection for the lamp fixture chassis.

12. The method of claim 9, wherein the attaching the ballast mounting fixture step comprises the steps of:

sliding the ballast mounting fixture into a securing tab on the installed mounting plate; and secure the ballast mounting fixture to the mounting plate with a removable fastener.

* * * * *